Sept. 2, 1952          G. E. FLINN          2,608,880

TRANSMISSION CONTROL

Filed Feb. 26, 1944          2 SHEETS—SHEET 1

Inventor:
George E. Flinn

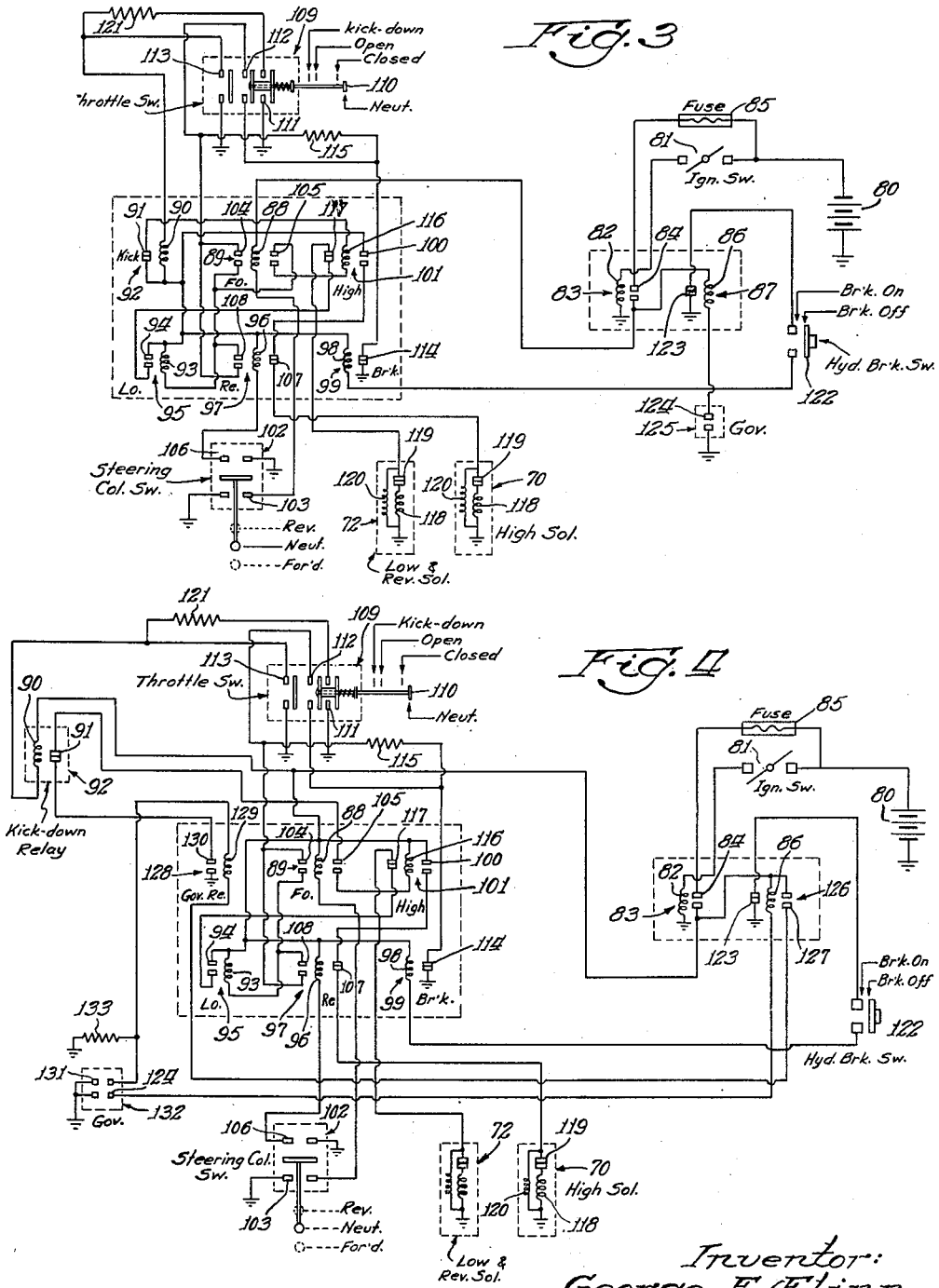

Patented Sept. 2, 1952

2,608,880

UNITED STATES PATENT OFFICE 2,608,880

TRANSMISSION CONTROL

George E. Flinn, Muncie, Ind., assignor to Borg-Warner Corporation, Chicago, Ill., a corporation of Illinois Application February 26, 1944, Serial No. 523,971

47 Claims. (Cl. 74—472)

1

My invention relates to transmissions and more particularly to controls for transmissions.

It is an object of my invention to provide an electric control arrangement for transmissions which is responsive to the speed of the driven shaft of a transmission to shift the transmission into a high speed ratio at a predetermined speed of the driven shaft and to downshift the transmission to a low speed ratio at a predetermined speed of the driven shaft which is lower than said first mentioned predetermined speed.

It is another object of my invention to provide an improved transmission control which functions to break a power train through the transmission functioning to drive the driven shaft from the driving shaft when the brakes of the vehicle are applied and the speed of the driven shaft is below a certain value.

It is a further object of my invention to provide an improved transmission control arrangement which functions in response to movement of the accelerator of a vehicle to complete a power train through a transmission when the accelerator is moved from a neutral throttle closing position to another position corresponding to closed throttle or to positions in which the throttle would be open. It is still another object to provide means for maintaining the power train completed through the transmission even though the accelerator is returned to its last mentioned throttle closing position. It is contemplated that the means, hereinbefore mentioned, for breaking a power train through a transmission in response to operation of the brakes below a predetermined speed of the driven shaft of the transmission shall function to return the transmission to neutral condition.

It is still a further object of my invention to provide a transmission control arrangement including a switch actuated by an accelerator of a vehicle on the accelerator being moved to a kickdown position corresponding to a position beyond fully opened throttle position for downshifting the transmission from a high speed ratio to a low speed ratio and also including means whereby, when the accelerator is released and the switch is returned to its original condition, the transmission nevertheless remains in its downshifted condition. It is contemplated that the arrangement preferably shall be such that the transmission may be upshifted to its high speed ratio thereafter by returning the accelerator to a fully closed neutral throttle position and returning it to a throttle opening position.

It is still another object of my invention to

2 provide an electric transmission control comprising a relay having a pair of switches which function when the relay is de-energized to complete one power train through the transmission and which function, when the relay is energized, to break the first-named power train and complete another power train through the transmission.

My invention consists of the novel constructions, arrangements, and devices to be hereinafter described and claimed for carrying out the above-stated objects and such other objects as will appear from the following description of preferred embodiments illustrated in the accompanying drawings, wherein:

Fig. 3 is a diagrammatic illustration of another portion of the control arrangement; and Fig. 4 is a diagrammatic illustration of a portion of another embodiment of the invention to be used for that portion of the arrangement illustrated in Fig. 3.

Like characters of reference designate like parts in the several views.

Figure 1:
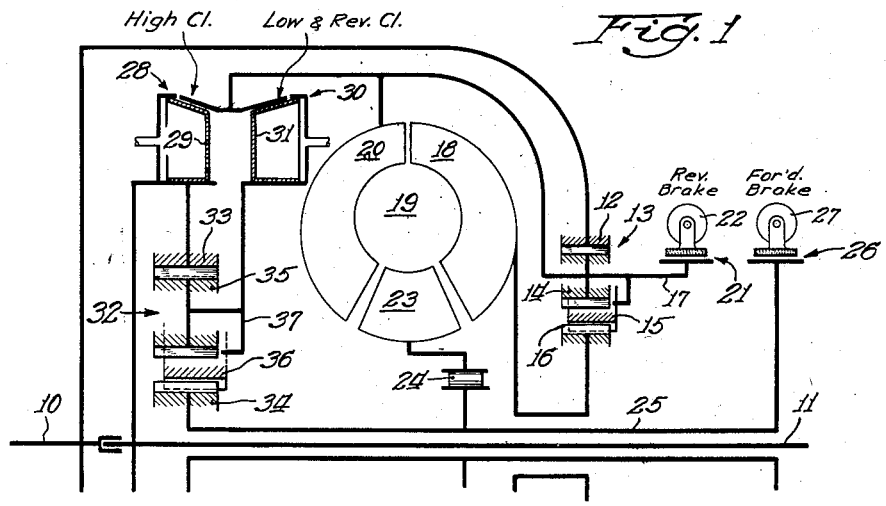
Fig. 1 is a diagrammatic illustration of a transmission on which my improved control arrangement may be used.

Referring now to Fig. 1 of the drawings, the illustrated transmission may be seen to comprise a driving shaft 10 and a driven shaft 11. The driving shaft 10 is connected with the ring gear 12 of a double type planet gear set 13. The gear set 13 comprises, in addition to the ring gear 12, planet gears 14 and 15, a sun gear 16, and a planet gear carrier 17. The planet gear 14 is in mesh with the ring gear 12 and with the planet gear 15, and the planet gear 15 is in mesh with the sun gear 16, as shown.

The sun gear 16 of the planet gear set 13 is connected with the impeller or driving element 18 of a hydro-dynamic torque converter 19, and the carrier 17 is connected with the rotor or turbine driven element 20 of the device 19. A brake 21 is provided for the carrier 17 of the planet gear set, and the brake is adapted to be engaged by any suitable fluid pressure responsive mechanism such as a pressure cylinder 22.

The torque converter 19 comprises, in addition to its driving element 18 and its driven element 20, a stator element 23 which is adapted when restrained in rotation to cause the rotor 20 to be driven at multiplied torque with respect to the torque impressed on the impeller 18. The stator 23 is connected by means of a one-way roller brake 24 with a shaft 25, and a friction brake 26 comprising a pressure cylinder 27 similar to the cylinder 22 is provided for the shaft 25.

A friction clutch 28 preferably of the cone type and comprising a fluid pressure operated piston 29 for engaging the clutch is provided for connecting directly the turbine element 20 and the driven shaft 11. A friction clutch 30 generally similar to the friction clutch 28 and comprising a fluid pressure operated piston 31 for engaging the clutch is provided for connecting the turbine element 20 and a planet gear set 32. The planet gear set 32 comprises a ring gear 33, a sun gear 34, planet gears 35 and 36 and a carrier 37 for the planet gears. The planet gear 35 is in mesh with the ring gear 33 and with the other planet gear 36, and the planet gear 36 is in mesh with the sun gear 34. The ring gear 33 is connected with the driven shaft 11; the carrier 37 is connected with the clutch 30; and the sun gear 34 is connected with the shaft 25, as shown. For an understanding of my improved transmission control arrangement, the transmission is deemed to be sufficiently disclosed in Fig. 1 of the drawings and in the above description; however, for a disclosure of certain details of the transmission, the patent to Harold E. Carnagua and Donald W. Kelbel, Patent No. 2,414,359, issued January 14, 1947, may be referred to.

The illustrated transmission provides a drive in reverse, a forward drive at a low speed ratio and a forward drive at a high speed ratio. In all of these drives, power is transmitted through the hydrodynamic device 19. The friction brake 26 is arranged when engaged to condition the transmission for forward drive, and the brake 21 is arranged when engaged to condition the transmission for reverse drive. The clutch 30 is arranged when engaged, with the brake 26 also engaged, to cause the shaft 11 to be driven in a forward direction at low speed ratio, and the clutch 28 when engaged, with the brake 26 also engaged, is arranged such that the shaft 11 is driven at a high speed ratio in the forward direction. The clutch 30 is engaged, in addition to the brake 21, for providing a reverse drive through the transmission.

The power train through the transmission in forward drive at low speed ratio, with the brake 26 and clutch 30 engaged, is from the driving shaft 10 to the planetary gear set 13 where the power divides, part of it being transmitted through the gear carrier 17 directly to the clutch 30, and the other part of it being transmitted through the sun gear 16 to the impeller element 18 and thence through the hydrodynamic converter 19 to the clutch 30. The power passes through the clutch 30 to the gear carrier 37 of the planetary gear set 32 and thence to the ring gear 33 and the driven shaft 11. The shaft 25 is held fixed by means of the brake 26 to hold the sun gear 34 from rotation, and the stator element 23 is held from reverse rotation by the two brakes 26 and 24. The stator element 23 when thus held causes the turbine element 20 to be driven at increased torque with respect to the torque impressed on the impeller 18. The one-way brake 24 releases after the turbine element 20 has attained a certain speed, depending on the load on the driven shaft 11, and the hydrodynamic device 19 thereafter functions simply as a fluid coupling. A load on the driven shaft 11 tends to hold the carrier 17 stationary due to its direct connection with the clutch 30, and when the driving shaft 10 is first started in rotation and there is substantially no power being transmitted through the hydrodynamic device 19, the planetary gear set 13 functions to drive the impeller element 18 at a relatively fast speed. The planetary gear set 32 functions to drive the shaft 11 at a torque which is greater than that impressed on the clutch 30 with the sun gear being held stationary to constitute a reaction point, in accordance with the well known principles of operation of planetary gear sets of the double planet gear type. Thus, in low speed forward drive, there is torque multiplication both through the hydrodynamic device 19 and through the planetary gear set 32.

The power train in forward drive at high ratio is the same as in forward drive at low ratio with the exception that the power instead of passing through the clutch 30, due to the disengagement of this clutch, passes through the clutch 28, which is engaged, directly to the driven shaft 11. In this speed ratio, there is torque multiplication in the hydrodynamic device 19, at least at low speeds of the driven shaft 11.

The power train in reverse drive, with the brake 21 and the clutch 30 engaged and with the brake 26 and clutch 28 disengaged, is from the driving shaft 10, through the planetary gear set 13 and from its sun gear 16 through the impeller 18, the stator 23, the one-way brake 24 and the planetary gear set 32 to the ring gear 33 of the gear set and the driven shaft 11. In reverse drive, the brake 21 functions to hold the turbine element 20 stationary, and, on rotation of the impeller 18, the elements 20 and 23 interchange functions, and the stator element 23 is driven at increased torque in the reverse direction. The roller unit 24 is so constructed to transmit torque in the reverse direction, and due to the fact that the gear set 32 is of the double planet gear type, the ring gear 33 is rotated in the reverse direction with rotation of the unit 24 and the sun gear 34 in this direction by the hydrodynamic device 19.

Figure 2:
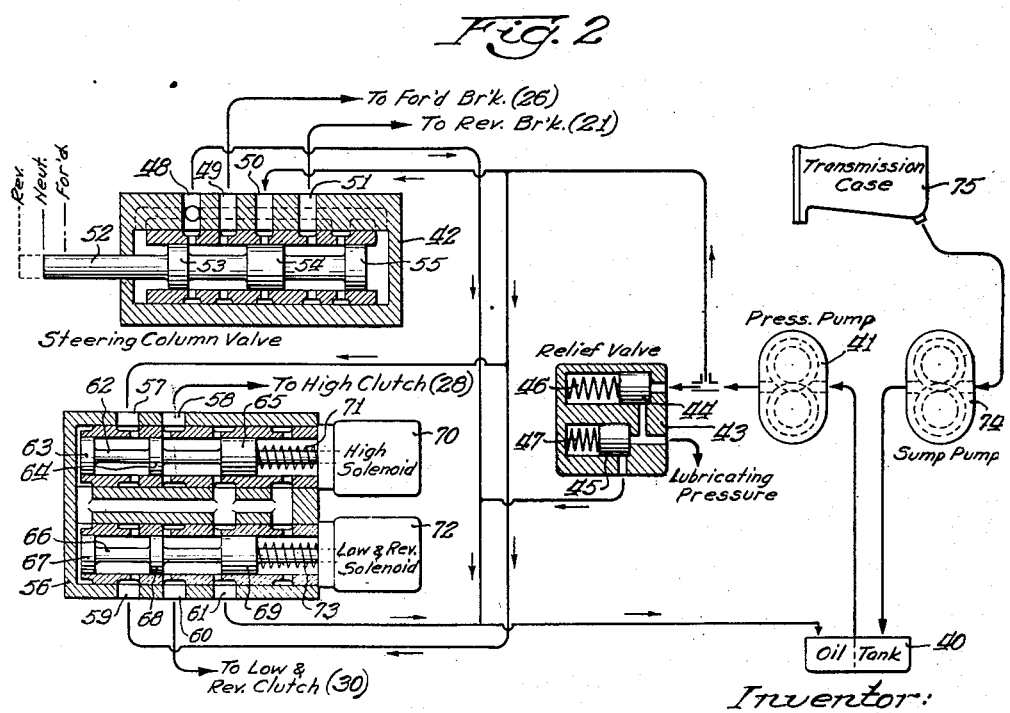
Fig. 2 is a diagrammatic illustration of a portion of my improved transmission control arrangement.

The hydraulic portion of the control arrangement for the transmission above described is shown in Fig. 2. The control arrangement comprises an oil tank 40 and a pressure pump 41 connected by any suitable fluid conduit with the tank and driven by an engine (not shown) for driving the driving shaft 10. The pressure pump 41 supplies oil under pressure to a valve 42 which is preferably mounted on the steering column of the automotive vehicle in which the transmission is installed. The pressure of the oil applied to the valve 42 is regulated by means of a relief valve 43 also connected with the pump 41 and comprising pistons 44 and 45 and springs 46 and 47 acting on the pistons. The piston 44 is acted on by the fluid as discharged from the pump 41, and it and the spring 46 function to maintain the oil supplied to the valve 42 at a certain pressure, as is apparent. The valve 43 is also adapted to provide oil under pressure for lubricating suitable parts of the transmission above described, and the piston 45 acted on by the oil discharged from piston 44 and the spring 47 function to maintain this oil under suitable pressure. The valve 43 is also connected to discharge excess oil back into the tank 40, as shown.

The steering column valve 42 is provided with passages 48, 49, 50, and 51 therein and has a piston 52 provided with lands 53, 54, and 55 slidably disposed therein. The passage 48 is provided for discharging excess oil from the valve 42 and is connected with the oil tank 40. The passage 50 is connected with the pressure pump 41 and thus constitutes a source of oil under pressure for the valve 42. The passage 49 is connected with the pressure cylinder 27 of the forward brake 26, and the passage 51 is connected with the pressure cylinder 22 of the reverse brake 21. As indicated in the drawings, the piston 52 has three principal positions, neutral, forward, and reverse. In the neutral position in which the piston is shown, the passage 50 is blocked by the land 54, and the passages 49 and 51 to the forward and reverse brakes are effectively connected with the passage 48 to the oil tank 40, for draining oil from the brake operators 22 and 27, the connection of the passage 51 to the passage 48 being by means of the groove between the lands 54 and 55 and an internal passage in the casing for the valve 42. When the piston is moved to its forward position, as indicated, the passages 49 and 50 are effectively connected between the lands 53 and 54, and oil under pressure flows to the forward brake 26 for engaging this brake. When the piston 52 is moved to its reverse position, as indicated, the passages 50 and 51 are effectively connected between the lands 54 and 55, and oil under pressure is applied to the reverse brake 21 for engaging this brake.

A valve 56 is provided for controlling the high clutch 28 and the low and reverse clutch 30. This valve is provided with passages 57 and 58 on one side thereof and with passages 59, 60, and 61 on the other side thereof. The passages 59 and 57 are connected with the pressure pump 41 and relief valve 43 by suitable fluid conduits, and these passages thus function as sources of fluid under pressure for the valve 56. The passage 58 is connected with the high clutch 28 to engage this clutch, and the passage 60 is connected to the low and reverse clutch 30 for energizing the latter clutch. The passage 61 is connected with the oil tank 40 and functions as an oil discharge passage. The valve 56 is provided with a piston 62 having lands 63, 64, and 65 and slidably disposed therein and is provided with another piston 66 having lands 67, 68, and 69, also slidably disposed therein. Each of the valves 62 and 66 have two principal positions, the one in which it is shown and another which is to the right as seen in the figure. The piston 66 in its position as shown functions to connect the passages 60 and 61 between the lands 68 and 69 for draining fluid from the low and reverse clutch 30 for maintaining the clutch disengaged. When the piston 66 is moved to the right to the other of its principal positions, it functions to connect the passages 59 and 60 between its lands 67 and 68 for supplying oil under pressure to the clutch 30 for engaging the clutch. The piston 62 in its position as shown effectively connects the passage 58 with the passage 61, due to suitable conduits within the valve 56, for draining fluid from the high clutch 28 and maintaining this clutch disengaged. The piston 62, when moved to the right to the other of its principal positions, functions to effectively connect the passages 57 and 58 between its lands 63 and 64 for applying fluid under pressure to the clutch 28 for engaging the clutch. Both of the pistons 62 and 66 are controlled by means of solenoids and springs, the piston 62 being controlled by the high solenoid 70 and the spring 71, and the piston 66 being controlled by the low and reverse solenoid 72 and the spring 73. The springs tend to move the pistons 62 and 66 into their positions as illustrated and tends to keep them in such positions, and the respective solenoids when energized tend to move the respective pistons into their other positions against the action of one of the springs, as is apparent.

A sump pump 74, connected by suitable fluid conduits with the oil tank 40 and a case 75 for the transmission above described, is preferably provided. This pump functions to draw any oil, that may leak from the parts of the transmission, back into the tank 40, and the pump is driven by the engine driving the transmission.

The electrical portion of the transmission control arrangement is shown in Fig. 3 of the drawings. The control arrangements utilize the battery 80 of the vehicle in which the transmission is installed and also the ignition switch 81 of the vehicle which is connected by any suitable means (not shown), as is ordinary practice, to the ignition system for the engine of the vehicle. The battery is grounded in accordance with common practice. The ignition switch 81 is connected with the winding 82 of a relay 83, as shown. The relay 83 comprises contacts 84, and the winding 82 is grounded so that when the ignition switch 81 is closed, a circuit is completed from the battery 80 to the winding 82 to energize the relay 83 and close the contacts 84. The contacts 84 are connected through a fuse 85 with the battery 80 and are connected to supply a voltage, when closed, to a winding 86 of a relay 87, a winding 88 of a "Forward" relay 89, a winding 90 and contacts 91 of a "Kickdown" relay 92, a winding 93 and contacts 94 of a "Low" relay 95, a winding 96 of a "Reverse" relay 97, a winding 98 of a "Brake" relay 99 and contacts 100 of a "High" relay 101.

The transmission control arrangement comprises a switch 102 which is preferably mounted on the steering column of the vehicle in which the transmission is installed. The switch 102 is intended for manual control and has three principal positions, namely, positions for reverse, neutral, and forward, as are indicated in the drawings. The switch 102 comprises a pair of contacts 103 one of which is grounded and the other of which is connected with the winding 88 of the Forward relay 89.

Assuming that the ignition switch 81 is closed whereby voltage is supplied as mentioned above, when the steering column switch 102 is moved to its forward position to close the contacts 103, the relay winding 88 is as a result energized. The relay 89 comprises contacts 104 and 105, and these contacts are closed upon such energization of the winding 88. The steering column switch 102 also comprises contacts 106, one of which is grounded and the other of which is connected with the winding 96 of the Reverse relay 97, and when contacts 106 are closed, the relay 97 is energized. The relay 97 comprises contacts 107 and 108, and when the winding 96 is de-energized as when contacts 106 are unconnected, the contacts 107 and 108 are in the conditions shown in the drawings, the contacts 107 being closed and the contacts 108 being open. When the winding 96 is energized as by conditioning switch 102 for reverse to close contacts 106, the conditions of the contacts 107 and 108 change, the contacts 107 being open and the contacts 108 being closed. It will be noted that in the neutral position of the switch 102, neither the contacts 103 nor 106 are closed, and neither of the relays 89 and 97 is energized. It is contemplated that the steering column switch 102 shall be controlled in conjunction with the steering column valve 42 shown in Fig. 2, with both the switch and valve being simultaneously conditioned for neutral, forward, or reverse in order to correspondingly condition the transmission.

A switch 109 is provided to be controlled by the accelerator 110 of the vehicle in which the transmission is installed. The switch 109 comprises contacts 111, 112, and 113, and the switch 109 is so arranged that the contacts 111 and 112 are closed when the accelerator 110 is slightly depressed from its neutral to its closed position, as indicated in the drawings. It will be understood, of course, that said "neutral" position also represents a closed condition of the throttle. The accelerator 110, however, must be depressed slightly from said "neutral" position to the adjoining position marked "closed" in the drawing, before contacts 111 and 112 are closed. Consequently, during movement of the accelerator between its neutral and closed positions, there is no resulting engagement of any of the clutches. It will be appreciated that "neutral" and "closed" positions of the accelerator adjoin and could each comprise a single locus or could each comprise a series of contiguous loci provided by limited movement of the accelerator.

Having reached its "closed" position, further depression of the accelerator 110 then results in an increasingly open throttle condition until the accelerator passes a position marked "open" in the drawings. Said "open" position corresponds to a fully opened throttle. Further depression of the accelerator then moves the accelerator to a position which is marked "kickdown" in the drawings during which movement the engine throttle is not further opened. At kickdown position the contacts 113 are closed by the accelerator 110. On a release of the accelerator, the contacts 113 are first opened on a passage of the accelerator through its open positions, and the contacts 111 and 112, while remaining closed when the accelerator moves from its kickdown to its closed position, open on movement of the accelerator from its closed to its neutral position. One of the contacts 112 is connected with the contacts 104 of the Forward relay 89 and with the contacts 108 of the Reverse relay 97, and the other of the contacts 112 is connected with contacts 114 of the Brake relay 99. One of the latter contacts is grounded, as shown. A resistor 115 is connected in parallel with the contacts 112 and in series with the contacts 114. The winding 116 of the High relay 101 is connected with the contacts 91 of the Kickdown relay 92 and with the contacts 105 of the Forward relay 89, and the latter are connected with the contacts 104 of this relay. When starting the vehicle the Kickdown and Brake relays 92 and 99 are de-energized and the contacts 91 and 114 are closed, and when the accelerator 110 is moved from its neutral position to its closed position such that the contacts 112 are connected, a circuit is completed through the winding 116 to energize the winding, the circuit being through the contacts 91, the winding 116, the contacts 105, the contacts 104, the contacts 112 and the contacts 114 to ground. The High relay 101 comprises the contacts 117 in addition to the contacts 100, and when this relay is energized, the contacts 100 close while the contacts 117 open. The High solenoid 70 is connected with the contacts 107 of the Reverse relay 97, which are closed when the switch 102 is conditioned for forward, and the contacts 107 are connected with the contacts 100 of the relay 101, and a circuit is completed through the contacts 100 and 107 for energizing the High solenoid 70 when the relay contacts 100 are thus closed.

The High solenoid 70 comprises an energizing coil 118, which is grounded, a switch 119 connected in series with the coil 118, and a holding coil 120 connected in parallel with the coil 118 and switch 119. The solenoid 70, when energized, by means of its energizing winding 118 moves the piston 62 to its position for connecting the passages 57 and 58 and engaging the High clutch 28. On such movement of the piston, the piston functions to open the switch 119 for stopping current flow through the coil 118, and current of sufficient magnitude thereafter flows in the coil 120 to hold the piston 62 in its position energizing the High clutch 28.

The High solenoid 70 remains energized after the contacts 112 have been so closed by the accelerator, regardless of any subsequent movement of the accelerator between its neutral and open positions and opening of the contacts 112. This is due to the action of the resistor 115 as will be described. When the contacts 112 are opened by movement of the accelerator to its neutral position, the resistor 115 in parallel with these contacts carries sufficient current to keep the relay 101 energized. When this relay is energized, its contacts 100 are closed, and the High solenoid 70 thus remains energized.

One of the contacts 113 of the accelerator switch 109 is connected with the winding 90 of the Kickdown relay 92, and the other contact 113 is grounded, as shown. When the accelerator 110 is moved to its Kickdown position, the contacts 113 are connected, and a circuit is thereby completed from the winding 90 of the Kickdown relay 92 through the contacts 113 to energize the winding. Such energization of relay 92 opens its contacts 91 and breaks the energizing circuit of the High relay 101 to de-energize it so that its contacts 117 move together and its contacts 100 separate. The High solenoid 70 is de-energized by the separation of contacts 100, and the piston 62 moves back to its position disengaging the High clutch 28. Previous to movement of the accelerator 110 to its kickdown position, the contacts 112 have of course been closed, and these contacts complete a circuit through the winding 93 of the Low relay 95, the circuit including the winding 93, contacts 104 of Forward relay 89, contacts 112 and contacts 114 of Brake relay 99 to ground. The Low relay 95 is thus energized and its contacts 94 are closed so that a circuit through the Low and Reverse solenoid 72 is completed by the contacts 117 on closing thereof due to de-energization of the relay 101, the circuit being through the contacts 94 and contacts 117 of High relay 101 to the solenoid 72. The solenoid 72 comprises the windings 118 and 120 and switch 119 similar to the corresponding parts in the High solenoid 70, and on energization of the solenoid 72, the valve piston 66 is moved to its position connecting the passages 59 and 60 to engage the Low and Reverse clutch 30. Moving of the accelerator 110 to its kickdown position thus has the effect of disengaging High clutch 28 and engaging Low and Reverse clutch 30 in lieu thereof.

The contacts 113 remain closed only so long as the accelerator 110 remains in its kickdown position; however, regardless of this, the Low and Reverse solenoid 72 remains energized and the High solenoid 70 remains de-energized while the accelerator is thereafter moved between its open and closed positions. This is due to a resistor 121 connected in series with the contacts 111 of accelerator switch 109. The contacts 111 are grounded and are connected in series with the winding 90 of the Kickdown relay 92. One of the contacts 111 is grounded as shown and on breakage of the circuit through the contacts 113 by a release of the accelerator 110, current of sufficient magnitude continues to flow through the winding 90 and through the resistor 121 and contacts 111 to ground to maintain the Kickdown relay 92 energized and the contacts 91 open. The Low and Reverse solenoid 72 thus remains energized and the High solenoid 70 remains de-energized. The contacts 111 are disconnected when the accelerator is moved to its neutral position, and the circuit through the winding 90 of the relay 92 is thus broken, the relay is de-energized, and the contacts 91 move together. Such closing of the contacts again conditions the winding 116 of the relay 101 for energization, and current will flow through this winding; however, the current is limited by flowing through the resistor 115 and is insufficient for energizing the High relay 101. The Low relay 95, however, remains energized due to sufficient current going through its winding 93, the contacts 104 of Forward relay 89, the resistor 115 and the contacts 114 of Brake relay 99 such that the contacts 94 remain closed and the Low and Reverse solenoid 72 remains energized. When the accelerator 110 is again moved to its closed position to connect the contacts 112, the relay 101 is again energized by means of a circuit through the contacts 91 of Kickdown relay 92, winding 116 of the High relay, and contacts 105, 104, 112, and 114 to ground. The contacts 100 of the High relay are thus closed, and its contacts 117 are opened, and the High solenoid 70 is energized and the Low and Reverse solenoid 72 is de-energized.

The two solenoids 70 and 72 and thereby the two clutches 28 and 30 are also under the control of the brake of the vehicle and a governor driven by the driven shaft of the transmission. The brake (not shown) of the vehicle, is connected to actuate a switch 122 which is connected with the winding 98 of the Brake relay 99 and is also connected with contacts 123 of the relay 87. The winding 86 of the relay 87 is connected with one of a pair of contacts 124 of a governor 125 driven by the driven shaft 11 of the transmission. The other one of the contacts 124 is grounded, as shown. When the speed of driven shaft 11 is above a predetermined value, the contacts 124 are closed and complete a circuit through the winding 86 of the relay 87. The relay 87 is thus energized and its contacts 123 are opened. Closing of the switch 122 under these conditions has no effect. When the speed of the shaft 11 is below the predetermined value, the contacts 124 are open, and the relay 87 is de-energized and its contacts 123 are closed. When the brake of the vehicle is thereafter applied, a circuit is completed from the winding 98 of the Brake relay 99 through the switch 122 and the contacts 123 to ground for energizing the Brake relay and opening its contacts 114. This opening of the contacts 114 functions to open circuits including the winding 93 of Low relay 95 or winding 116 of High relay 101 and through the switch 112 or resistor 115. Both the High and Low relays 101 and 95 are thereby de-energized for opening the contacts 94 and 100 thereof, and both solenoids 70 and 72 are thereby de-energized. Both clutches 28 and 30 are thereby disengaged, and the transmission is in neutral.

When the transmission is conditioned for reverse drive by moving the switch 102 to connect the contacts 106, while simultaneously so conditioning the steering column valve 42, the winding 96 of the Reverse relay 97 is energized through the contacts 106, and the contacts 107 of this relay are opened while contacts 108 of the relay are closed. The opening of the contacts 107 prevents subsequent energization of the High solenoid 70 and thus prevents any shifting into high ratio in reverse drive. Under these conditions, the High relay 101 furthermore cannot be energized, since the Forward relay 89 is de-energized and its contacts 105 are separated. The contacts 117 of High relay 101 are thus closed under these conditions. Closing of the contacts 108 allows energization of the Low and Reverse relay 95 through the contacts 108, the contacts 112 connected by accelerator movement and contacts 114 of the Brake relay 99. This energization of the relay 95 allows a circuit to be completed through its contacts 94 and contacts 117 of High relay 101 to the Low and Reverse solenoid 72 for engaging the Low and Reverse clutch 30 to complete the reverse power train through the transmission.

The operation of the transmission and control arrangement is believed clear from the above description; however, it may be briefly summarized as follows: With the valve 42 and switch 102 conditioned for forward drive, the transmission remains in neutral with the solenoids 70 and 72 de-energized and the clutches 28 and 30 disengaged until the accelerator 110 is depressed to bring it to its closed position. Thereupon the High solenoid 70 is energized and the High clutch 28 is engaged to complete a forward drive at high ratio through the transmission. When the accelerator is moved to kickdown position, the solenoid 70 is de-energized and the solenoid 72 is energized for disengaging the clutch 28 and engaging the clutch 30 to complete a low ratio power train through the transmission. This low ratio power train remains completed until the accelerator 110 is moved back to neutral position and then returned to its closed position whereupon the high ratio power train is completed. The governor 125 and the brake switch 122 functions to maintain the solenoids 70 and 72 de-energized and the clutches 28 and 30 disengaged when the speed of the driven shaft 11 is below the critical speed of the governor 125 and the brake of the vehicle is applied. When the valve 42 and the switch 102 are conditioned for reverse, the reverse brake 21 is engaged, and the low and reverse solenoid 72 may be energized to engage the low and reverse clutch 30 for completing the reverse power train through the transmission.

The electric arrangement illustrated in Fig. 4 of the drawings constitutes another embodiment of the invention and may be used instead of the electric arrangement shown in Fig. 3. Many of the component parts of the Fig. 4 arrangement are the same as parts in the Fig. 3 arrangement, and like characters of reference in the two figures indicate like parts.

Referring now to Fig. 4, the ignition switch 81 and relay 83 illustrated are connected in the same manner as in the Fig. 3 arrangement to apply a voltage through the fuse 85 to a number of electric mechanisms. As in the Fig. 3 arrangement, when the contacts 84 of relay 83 are closed, a voltage is applied to the winding 86 which is part of a relay 126 and comprises contacts 127 not found in the corresponding relay 87 of the Fig. 3 arrangement, and a voltage is applied also, as in the Fig. 3 arrangement, to windings 88, 93, 96, 98, and 90 and to contacts 100 and 94. Unlike the Fig. 3 arrangement, the voltage is applied also to the winding 116 of the High relay 101 and is not applied to the contacts 91 of the Kickdown relay 92. The arrangement of the steering column switch 102 and the Forward and Reverse relays 89 and 97 is the same as in the Fig. 3 arrangement. The contacts 114 of the Brake relay 99, the contacts 112 and the contacts 104 of the Forward relay 89 are connected in series in the same manner as in the Fig. 3 arrangement, and the resistor 115 is similarly connected in parallel with the contacts 112. The winding 116 of the High relay 101, as in the Fig. 3 arrangement, is connected with the contacts 105 of the Forward relay 89, but the contacts 105 are not connected with the contacts 104 as in the Fig. 3 arrangement, but are rather connected with the contacts 91 of the Kickdown relay 92.

A relay 128 which may be termed a Governor relay and is not found in the Fig. 3 arrangement, is provided in the Fig. 4 arrangement. This relay comprises a winding 129 and relay contacts 130. The contacts 130 are connected with the contacts 91 of Kickdown relay 92 and are grounded, as shown. The winding 129 is connected with the contacts 127 of the relay 126 and is connnected with contacts 131 of a governor 132 responsive to the speed of the driven shaft 11 of the transmission. The governor 132 also includes the contacts 124 included in the Fig. 3 arrangement, and these contacts are closed at a relatively slow speed of the driven shaft 11, such as a shaft speed corresponding to approximately five miles an hour vehicle speed, and the contacts 131 of the governor close at some higher speed of the driven shaft 11, preferably corresponding to approximately twenty miles per hour vehicle speed. The winding 86, as in the Fig. 3 arrangement, when the speed of the shaft 11 is sufficient to close the contacts 124, is energized through these contacts and causes the contacts 123 to open, and the winding in addition causes a closing of the contacts 127. Such closing of the contacts 127 has no immediate effect; however, when the contacts 131 close at a higher speed of the shaft 11, an electric circuit is thereby completed through the contacts 127, the winding 129 of the Governor relay 128, and the contacts 131. The Governor relay 128 is thereby energized, and its contacts 130 are closed. A resistor 133 is connected in parallel with the contacts 131, as shown. Although the contacts 131 of the governor 132 must close in order to close the contacts 130 of the relay 128, the resistor 133 in parallel with these contacts 131 permits a flow of sufficient current through the winding 129 to maintain the contacts 130 closed when the contacts 131 of the governor open. When the speed of the driven shaft 11 decreases so that the contacts 124 of the governor open, the relay 126 will be de-energized to open the contacts 127, and the circuit through the winding 129 of the Governor relay 128 will thus be opened, and the relay contacts 130 will open. It will thus be apparent that due to the functioning of the governor 132 and resistor 133, the relay contacts 130 will close at the high critical speed of the governor 132 but will remain closed until the speed of the shaft 11 decreases to the low critical speed of the governor 132.

Assuming the steering column valve 42 and switch 102 have been set for forward drive, when the accelerator 110 is moved to connect the contacts 112, a circuit is completed through the winding 93 of the Low relay 95 through the contacts 104 of the Forward relay 89, contacts 112 and contacts 114 of the Brake relay 99 to energize the Low relay 95 and close its contacts 94. Voltage is thereby applied through the contacts 94 and contacts 117 of the High relay to the Low and Reverse solenoid 72 to condition the transmission for low speed forward drive. The High relay 101, which when energized would break the circuit to the solenoid 72 and would complete a circuit to the High solenoid 79 is not energized at this time, due to the fact that the contacts 130 of the Governor relay are in series with the winding 116 of the High relay and do not close until the speed of the shaft 11 reaches the high critical speed of the governor 132. When the speed of the shaft 11, and thereby of the vehicle, increases sufficiently to close the contacts 131, the contacts 130 are thereby closed to complete a circuit through the winding 116, the circuit including the winding, the contacts 105 of the Forward relay 89, the contacts 91 of the Kickdown relay 92 and the contacts 130, to energize the High relay 101. Such energization of this relay opens its contact 117 and thereby de-energizes the solenoid 72 in series with these contacts and closes its contacts 100 to complete a circuit from these contacts through the contacts 107 of the Reverse relay 97 to the High solenoid 70 for energizing the solenoid and shifting the transmission to high speed forward ratio. As has been described, when the speed of the shaft 11 and the vehicle decreases sufficiently to open the governor contacts 124, the relays 126 and 128 are de-energized to open the contacts 130 of the latter relay. On such opening of the contacts 130 the circuit through the winding 116 is broken, and the High relay 101 returns to its original condition to complete a circuit through the Low and Reverse solenoid and de-energize the High solenoid to shift the transmission to low speed forward ratio. The resistor 115 functions in this arrangement to maintain the transmission in low speed ratio, if the transmission is previously in that speed ratio, when the accelerator 110 is moved to its neutral position.

The contacts 113 in the accelerator switch 109 function similarly as in the Fig. 3 arrangement to energize the Kickdown relay 92 when the accelerator is moved to its kickdown position, and when the transmission is in high speed forward ratio, energization of the relay 92 and the resultant opening of its contacts 91 causes a de-energization of the High relay 101 and a resultant shifting of the transmission from high ratio to low ratio. The resistor 121 connected in series with the winding 90 functions similarly as in the Fig. 3 arrangement to maintain the relay 92 energized after a kickdown has been made until the accelerator 110 is brought back to its neutral position. The brake switch 122 and contacts 123 in series therewith function similarly as in the Fig. 3 arrangement to complete a circuit through the winding 98 of Brake relay 99 to open the relay contacts 114 when the speed of the driven shaft 11 is below the critical speed at which the contacts 124 are opened and the brake of the vehicle is applied. The contacts 114 in the Fig. 4 arrangement are in series with the winding 93 of the Low relay 95, as in the Fig. 3 arrangement, and these contacts function to de-energize the relay 95 when opened and thereby de-energize the Low and Reverse solenoid. The contacts 114 are not connected in series with the winding 116 in High relay 101, unlike the connection in the Fig. 3 arrangement; however, since the contacts 130 of the Governor relay 128 open at the low critical speed of the governor 132 and cause a de-energization of the High relay 101, an opening of the contacts 114 below the low critical speed of the governor 132 by application of the vehicle brake nevertheless causes the transmission to be put in neutral condition. The steering column switch 102 when moved, along with the steering column valve 42, for reverse, functions to condition the transmission for reverse in the same manner as in Fig. 3 arrangement.

The operation of the Fig. 4 arrangement is deemed clear from the above description; however, it will be stated briefly as follows: When the ignition switch 81 is closed, the transmission is in neutral with neither of the solenoids 70 and 72 being energized. When the accelerator 110 is thereafter moved to its closed position, assuming the switch 102 and valve 42 have been conditioned for forward drive, the low and reverse solenoid 72 is energized to shift the transmission to low speed forward drive. When the speed of the vehicle increases above the high critical speed of the governor 132, the solenoid 70 is energized and the solenoid 72 de-energized to shift the transmission to high speed ratio. If the accelerator 110 is thereafter moved to kickdown position, the solenoid 70 is de-energized and the solenoid 72 is energized to shift the transmission to low speed forward drive. In order to shift the transmission back to high speed ratio, assuming the speed of the vehicle is sufficient, the accelerator is released to its neutral position and returned to its closed position. The transmission is shifted to neutral when the speed of the driven shaft 11 is below the low critical governor speed and the brake of the vehicle is applied.

I wish it to be understood that my invention is not to be limited to the specific constructions and arrangements shown and described, except only insofar as the appended claims may be so limited, as it will be apparent to those skilled in the art that changes may be made without departing from the principles of the invention.

I claim:

1. In a transmission mechanism for an automotive vehicle, the combination of driving and driven shafts, means for completing a power train between said shafts including an electromagnet, a brake for the vehicle, a governor responsive to the speed of said driven shaft, and means under the control of said governor and said brake for breaking said power train when said brake is applied and the speed of said driven shaft is below a predetermined value, said last named means including a switch actuated by the brake when operated and a switch actuated by said governor at said predetermined speed, said switches cooperating to deenergize said electromagnet to break said power train.

2. In transmission mechanism for an automotive vehicle, the combination of driving and driven shafts, means for completing a power train between said shafts at a low speed ratio, means for completing a power train between said shafts at a high speed ratio, an accelerator for the vehicle having a closed throttle position and movable therefrom to open the vehicle throttle and having an open throttle kickdown position, a brake for the vehicle, a governor responsive to the speed of said driven shaft, means under the control of said accelerator for breaking said second-named power train and completing said first-named power train when the accelerator is moved to its said open throttle kickdown position, and means under the control of said governor and said brake for breaking either of said power trains when said brake is applied and the speed of said driven shaft is below a predetermined value.

3. In transmission mechanism for an automotive vehicle, the combination as specified in claim 2, each of said power train completing means including an electro-magnet, said means under the control of said governor and said brake including a switch actuated by the brake when applied and a switch actuated by said governor at said predetermined speed, said means under the control of said accelerator including a switch actuated by the accelerator, both of said electromagnets being de-energized when said brake is applied and the speed of said driven shaft is below said predetermined value and the electromagnet for said low speed ratio power train being energized and the other electro-magnet being de-energized when said accelerator is moved to its kickdown position.

4. In transmission mechanism for an automotive vehicle, the combination of driving and driven shafts, means for completing a power train between said shafts at a low speed ratio, means for completing a power train between said shafts at a high speed ratio, a brake for the vehicle, a governor responsive to the speed of said driven shaft, means under the control of said governor for breaking said low ratio power train and for completing said higher ratio power train at a predetermined speed of said driven shaft, and means under the control of said governor and said brake for breaking either of said power trains when said brake is applied and said driven shaft is rotating below another predetermined speed thereof.

5. In transmission mechanism for an automotive vehicle, the combination of driving and driven shafts, means for completing a power train between said shafts at a low speed ratio, means for completing a power train between said shafts at a high speed ratio, a brake for the vehicle, a governor responsive to the speed of said driven shaft, means under the control of said governor for breaking said low speed ratio power train and completing said high speed ratio power train at a predetermined speed of said driven shaft and for completing said low speed ratio power train and breaking said high speed ratio power train at a certain predetermined lower speed of said driven shaft, and means under the control of said governor and said brake for breaking either of said power trains when said brake is applied and the speed of said driven shaft is below said last-named predetermined value.

6. In transmission mechanism for an automotive vehicle, the combination of driving and driven shafts, means for completing a power train between said shafts at a low speed ratio, means for completing a power train between said shafts at a high speed ratio, a brake for the vehicle, an accelerator for the vehicle having a closed throttle position and movable therefrom to open the vehicle throttle and having an open throttle kickdown position, a governor responsive to the speed of said driven shaft, means under the control of said governor for breaking said low ratio power train and completing said high ratio power train at a predetermined speed of said driven shaft and for completing said low ratio power train and breaking said high ratio power train at a predetermined lower speed of said driven shaft, means under the control of said accelerator for completing said low ratio power train and breaking said high ratio power train when the accelerator is moved to its said open throttle kickdown position, and means under the control of said governor and said brake for breaking either of said power trains when said brake is applied and the speed of said driven shaft is below said predetermined lower speed.

7. In transmission mechanism for an automotive vehicle, the combination as specified in claim 6, said power train completing means each including an electro-magnet, said means under the control of said governor and said brake and said means under the control of said accelerator including a switch actuated by the brake when applied, a switch actuated by said accelerator when moved to its kickdown position, and a pair of switches actuated by said governor at both said predetermined speeds, said electro-magnets being energized to complete the respective power trains and being de-energized to break the respective power trains.

8. In transmission mechanism for an automotive vehicle, the combination of driving and driven shafts, a governor responsive to the speed of the driven shaft, electrically controlled means for completing a power train between said shafts at a low speed ratio, electrically controlled means for completing a power train between said shafts at a high speed ratio, and means for breaking said low speed ratio power train and completing said high speed ratio power train at a predetermined speed of said driven shaft and for completing said low speed ratio power train and breaking said high speed ratio power train at a lower predetermined speed of said driven shaft, said last-named means including a switch closed by said governor at said lower predetermined speed and a switch closed by said governor at said higher predetermined speed, said switches being connected in series, a relay actuated when both said switches are closed for completing said high speed ratio power train and breaking said low speed ratio power train, and a resistance in parallel with said switch actuated at said higher predetermined speed for maintaining said relay in actuated condition until the speed of said driven shaft decreases below its lower predetermined speed.

9. In transmission mechanism for an automotive vehicle, the combination of driving and driven shafts, means for completing a power train between said shafts at a low speed ratio, means for completing a power train between said shafts at a high speed ratio, an electro-magnet for operating each of said last-named means for making the means effective when the electro-magnet is energized, a governor responsive to the speed of said driven shaft, and means under the control of said governor for energizing said electro-magnet for said high speed ratio power train for completing the power train at a predetermined speed of said driven shaft and for de-energizing said last-named electro-magnet and energizing the electro-magnet of the low speed ratio power train for making the latter power train effective at a lower predetermined speed of said driven shaft, said last-named means including a switch closed by said governor at said lower predetermined speed, a switch closed by said governor at said higher predetermined speed and connected in series with said first-named switch, a relay responsive to electric current through said switches for energizing the electromagnet for said high speed ratio and de-energizing the other electro-magnet, and a resistor connected in parallel with said switch actuated at said higher predetermined speed of said driven shaft, whereby said relay is effective to maintain the electro-magnet of the high speed ratio power train energized until the speed of said driven shaft has decreased below said lower predetermined speed.

10. In transmission mechanism for an automotive vehicle, the combination of driving and driven shafts, means providing a power train between said shafts, an accelerator having a throttle operating range between closed and open throttle positions and having a neutral position at the closed throttle end of said range and outside of said range, means under the control of said accelerator for completing said power train when the accelerator is moved from its neutral position to closed position thereof, and means for maintaining said power train completed for all positions of the accelerator including its said neutral position after said accelerator is moved from its neutral position.

11. In transmission mechanism for an automotive vehicle, the combination as specified in claim 10, said means for completing said power train comprising an electro-magnet which, when energized, completes the power train, a switch closed when the accelerator is moved to said closed position, and a relay connected with said switch to be energized on a closing thereof for energizing the electro-magnet, said means for maintaining said power train completed comprising a resistor connected in parallel with said switch.

12. In transmission mechanism for an automotive vehicle, the combination of driving and driven shafts, an electrical circuit having a source of power, an accelerator for the motor of said vehicle, a switch controlled by said accelerator and adapted to complete said circuit upon movement of said accelerator, means for completing a power train between said shafts at a low ratio and including an electro-magnet which when energized completes the power train, means for completing a power train between said shafts at a high ratio and including another electro-magnet which when energized completes the power train, and a relay having an energizing winding in said circuit and in series with said accelerator controlled switch and having a pair of switches controlled by the relay, each of said relay controlled switches being connected with one of said electro-magnets, said relay controlled switches being respectively open and closed when said relay is energized and respectively closed and open when the relay is deenergized whereby one of said electro-magnets is energized to complete its power train while the other electro-magnet is de-energized for breaking its power train.

13. In transmission mechanism for an automotive vehicle, the combination of driving and driven shafts, means providing a power train between said shafts, an accelerator having a throttle operating range between closed and open throttle positions and having a neutral position at the closed throttle end of said range and outside of said range, means under the control of said accelerator for completing said power train when the accelerator is moved from its said neutral position to its said closed throttle position, means for maintaining said power train completed for all positions of the accelerator after the accelerator is so moved from its neutral position, a governor responsive to the speed of said driven shaft, a brake for the vehicle, and means under the control of said governor and said brake for breaking said power train and overruling said means for maintaining the power train completed when said brake is applied and the speed of said driven shaft is below a predetermined value.

14. In transmission mechanism for an automotive vehicle, the combination as specified in claim 13, said means for completing said power train comprising an electro-magnet which when energized completes the power train, a switch closed when the accelerator is so moved from its neutral position to its said closed throttle position, and a relay connected with said switch to be energized on a closing thereof for energizing the electro-magnet, said means for maintaining the power train completed for all positions of the accelerator comprising a resistor connected in parallel with said switch, said means for breaking said power train and overruling said last-named means comprising a governor actuated switch and a brake actuated switch connected to break a circuit through said accelerator operated switch when the brake is applied and the speed of the driven shaft is below said predetermined value.

15. In transmission mechanism for an automotive vehicle, the combination of driving and driven shafts, means for providing a power train between said shafts and including a power engaged friction coupling for completing the power train, a source of power adapted to be connected to said coupling for engaging it, a brake for the vehicle, a governor responsive to the speed of said driven shaft, means under the control of said brake for disconnecting said coupling from said source of power to thereby disengage the coupling and break said power train when said brake is applied, and means controlled by said governor for overruling said brake controlled means and thereby preventing the breaking of said power train when the speed of said driven shaft is above a predetermined value.

16. In transmission mechanism for an automotive vehicle, the combination of driving and driven shafts, means providing a power train between said shafts and including a fluid pressure engaged friction clutch for completing the power train, a source of fluid pressure adapted to be connected to said clutch for engaging it, a brake for the vehicle, a governor responsive to the speed of said driven shaft, means under the control of said brake for disconnecting said source of fluid pressure from said clutch for disengaging the clutch when said brake is applied, and means controlled by said governor for overruling said brake controlled means and thereby preventing the breaking of said power train when the speed of said driven shaft is above a predetermined value.

17. In transmission mechanism for an automotive vehicle, the combination of driving and driven shafts, means for providing a power train between said shafts at a low speed ratio, means for providing a power train between said shafts at a high speed ratio, each of said power trains including a power engaged friction coupling for completing the power train when engaged, means for shifting between said high and low speed ratios by engaging one of said couplings while disengaging the other of said couplings, a brake for the vehicle, a governor responsive to the speed of said driven shaft, and means under the control of said governor and said brake for breaking either of said power trains by de-energizing the respective one of said couplings when said brake is applied and said driven shaft is rotated below a predetermined speed thereof.

18. In transmission mechanism for an automotive vehicle, the combination of driving and driven shafts, means for providing a power train between said shafts at a low speed ratio, means for providing a power train between said shafts at a high speed ratio, each of said power trains including a friction clutch engaged by the application of fluid pressure thereto for completing the respective power train, a source of fluid pressure adapted to be connected to said clutches, means for completing one of said power trains while breaking the other power train by disconnecting said fluid pressure source from one of said friction clutches while connecting it to the other friction clutch, a brake for the vehicle, a governor responsive to the speed of said driven shaft, and means under the control of said governor and said brake for breaking either of said power trains by disconnecting said fluid pressure source from the respective friction clutch when said brake is applied and said driven shaft is rotated below a predetermined speed thereof.

19. In transmission mechanism for an automotive vehicle, the combination of driving and driven shafts, means for completing a power train between said shafts at a low speed ratio, means for completing a power train between said shafts at a high speed ratio, a brake for the vehicle, a governor responsive to the speed of said driven shaft, means connected with said governor and operative to shift the transmission from its low speed ratio to its high speed ratio by rendering said first named means inoperative and said second named means operative when the driven shaft speed exceeds a predetermined value, means under the control of said brake for breaking either of said power trains when said brake is applied, and means controlled by said governor for overruling said brake controlled means and thereby preventing the breaking of said power train when the speed of said driven shaft is above a second predetermined value.

20. In transmission mechanism for an automotive vehicle, the combination of driving and driven shafts, means for providing a power train between said shafts at a low speed ratio and including a power engaged friction coupling for completing the power train, means for providing a power train between said shafts at a high speed ratio and including a power engaged friction coupling for completing the power train, a source of power adapted to be connected to said couplings for engaging them, a governor responsive to the speed of said driven shaft, means under the control of said governor for shifting from said low speed ratio to said high speed ratio by disconnecting said first named coupling from said source of power and connecting said second named coupling with said source of power when the speed of said driven shaft exceeds a predetermined value, a brake for the vehicle, and means under the control of said governor and said brake for breaking either of said power trains by de-energizing the respective one of said couplings when said brake is applied and the speed of said driven shaft is below a predetermined value.

21. In transmission mechanism for an automotive vehicle, the combination of driving and driven shafts, means providing a power train between said shafts, an accelerator for the vehicle, means for completing said power train including an accelerator actuated device and a second device operated by said accelerator actuated device to start and accelerate the vehicle when the accelerator is moved from a closed throttle position toward an open throttle position, and means acting on said second device made effective by the operation of said second device for holding the second device in operated condition once it has been operated by said accelerator actuated device to thereby automatically maintain said power train completed when said accelerator is released toward the closed throttle position.

22. In transmission mechanism for an automotive vehicle, the combination of driving and driven shafts, means providing a power train between said shafts, an accelerator for the vehicle having a throttle operating range between closed and open throttle positions and having a neutral position at the closed throttle end of said range and outside of said range, means for completing said power train including an accelerator actuated device and a second device operated by said accelerator actuated device to start and accelerate the vehicle when the accelerator is moved from said neutral position toward said open throttle position, and means acting on said second device made effective by the operation of said second device for holding the second device in operated condition once it has been operated by said accelerator actuated device to thereby automatically maintain said power train completed when said accelerator is released toward the throttle operating range to its said neutral position.

23. In transmission mechanism for an automotive vehicle, the combination of driving and driven shafts, means providing a power train between said shafts and including a friction coupling, an accelerator for the vehicle, means for completing said power train including an accelerator actuated device and a second device operated by said accelerator actuated device to engage said friction coupling to complete said power train and start and accelerate the vehicle when the accelerator is moved from a closed throttle position thereof toward its open throttle position, and means acting on said second device made effective by the operation of said second device for holding the second device in operated condition once it has been operated by said accelerator actuated device to thereby maintain said friction coupling engaged and said power train completed when said accelerator is released toward the closed throttle position.

24. In transmission mechanism for an automotive vehicle, the combination of driving and driven shafts, means providing a power train between said shafts and including a fluid pressure actuated friction clutch, a source of fluid pressure adapted to be connected with said clutch for engaging it, and accelerator for the vehicle, means for completing said power train including an accelerator actuated device and a second device operated by said accelerator actuated device for connecting said clutch with said source of fluid pressure to thereby complete said power train to start and accelerate the vehicle when the accelerator is moved from a closed throttle position thereof toward an open throttle position, and means acting on said second device made effective by the operation of said second device for holding the second device in operated condition once it has been operated by said accelerator actuated device to thereby automatically maintain said friction clutch engaged and said power train completed when said accelerator is released toward the closed throttle position.

25. In transmission mechanism for an automotive vehicle, the combination as specified in claim 21, said means under the control of said throttle comprising a switch closed when the throttle is so moved from its said closed throttle position, an electro-magnet connected with said switch and energized on a closing of the switch, said means for maintaining said power train completed including a resistor in parallel with said switch for maintaining said electro-magnet energized even though said switch is opened.

26. In transmission mechanism for an automotive vehicle, the combination as specified in claim 23, said means for completing said power train comprising an electromagnet which when energized engages said friction coupling and a switch closed when said accelerator is so moved from its closed throttle position, said means for maintaining said power train completed comprising a resistor connected in parallel with said switch which functions to maintain said electromagnet energized even though said switch is opened.

27. In a transmission mechanism for an automotive vehicle, the combination of driving and driven shafts, means providing a power train between said shafts and including a power operated coupling for completing the power train, a source of power adapted to be connected with said coupling to engage the coupling, an accelerator having a throttle operating range between closed and open throttle position and having a neutral position at the closed throttle end of said range and outside of said range, and means under the control of said accelerator for connecting said source of power to said coupling to engage the coupling and to thereby complete said power train when the accelerator is moved from its said neutral position toward said open throttle position, said last named means comprising an electro-magnet connecting said coupling with said source of power when the electro-magnet is energized, and a switch for energizing the electro-magnet, which switch is closed when the accelerator is moved from its said neutral position to its said closed throttle position.

28. In transmission mechanism for an automotive vehicle, the combination of driving and driven shafts, means for providing a power train between said shafts at a low speed ratio and including a fluid pressure engaged friction clutch, means for completing a power train between said shafts at a high speed ratio and including a fluid pressure engaged friction clutch, a source of fluid pressure for said clutches, means for initially engaging said second-named friction clutch to complete said high speed power train to start said vehicle from rest by connecting this clutch with said pressure source, an accelerator, and means under the control of said accelerator for disengaging said second-named friction clutch and for engaging said first-named friction clutch by disconnecting said second-named clutch and said source and connecting said first-named clutch and source to shift the transmission mechanism from high ratio to low ratio when the accelerator is moved to an open throttle kickdown position, at least one of said power trains including a hydrodynamic coupling device in series with the respective friction clutch.

29. In transmission mechanism for an automotive vehicle, the combination of driving and driven shafts, means for providing a power train between said shafts at a low speed ratio and including a fluid pressure engaged friction clutch for completing the power train, means for providing a power train between said shafts at a high speed ratio and including a fluid pressure engaged friction clutch for completing the power train, a source of fluid pressure adapted to be connected to said clutches, an accelerator, means under the control of said accelerator for starting said vehicle from rest in said high speed ratio by connection of said second named friction clutch with said fluid pressure source for engagement of the clutch when the accelerator is moved from a closed throttle position in the direction of throttle opening, and means under the control of said accelerator for disconnecting said second-named friction clutch from said fluid pressure source and connecting said first named friction clutch with said fluid pressure source for disengaging the former and engaging the latter clutch whereby to downshift the transmission mechanism from high speed ratio to low speed ratio when the accelerator is moved to an open throttle kickdown position, at least one of said power trains including a hydrodynamic coupling device in series with the respective clutch.

30. In transmission mechanism for an automotive vehicle, the combination of driving and driven shafts, means for completing a power train between said shafts at a low speed ratio, means for completing a power train between said shafts at a high speed ratio, an accelerator for the vehicle, means under the control of said accelerator for completing said high speed power train to start said vehicle from rest by movement of the accelerator from a closed throttle position in the direction of throttle opening, and means under the control of said accelerator for breaking said second-named power train and completing said first-named power train when the accelerator is moved to an open throttle kick-down position, said first-named means under the control of said accelerator including an electrical switch actuated upon a predetermined throttle opening movement of the accelerator adjacent the closed throttle position of the accelerator and said second-named means under the control of said accelerator including an electrical switch actuated when the accelerator is moved to its said kick-down position.

31. In transmission mechanism for an automotive vehicle, the combination of driving and driven shafts, means for providing a power train between said shafts at a low ratio, means for providing a power train between said shafts at a high ratio, each of said means including a power engaged clutch for completing the respective power train, a source of power adapted to be connected to said clutches, an accelerator, means under the control of said accelerator for disconnecting the clutch for said high ratio power train from said source of power for disengaging the clutch and for connecting the clutch for said low ratio power train with said power source for engaging the latter clutch to down shift the transmission mechanism from high ratio to low ratio when the accelerator is moved to an open throttle kick-down position, said last-named means including an accelerator actuated device and a second device operated by said accelerator actuated device, and means acting on said second device rendered effective by the operation of said second device for holding the second device in operated condition once it has been operated by said accelerator actuated device to thereby maintain said clutches in their last mentioned conditions with respect to said power source and the transmission mechanism in low ratio when the accelerator is thereafter moved from its said kick-down position back to a closed throttle position and between its said kick-down position and said last mentioned closed throttle position.

32. In transmission mechanism for an automotive vehicle, the combination of driving and driven shafts, means for providing a power train between said shafts at a low ratio, means for providing a power train between said shafts at a high ratio, each of said means including a fluid pressure operated friction clutch for completing the respective power train, a source of fluid pressure adapted to be connected to said friction clutches for engaging them, an accelerator, means under the control of said accelerator for disconnecting the friction clutch for said high speed ratio power train from said source of fluid pressure for disengaging the clutch and for connecting the friction clutch for said low ratio power train with said source of fluid pressure for engaging the latter clutch to thereby downshift the transmission from high speed ratio to low speed ratio when the accelerator is moved to an open throttle kick-down position, said last-named means including an accelerator actuated device and a second device operated by said accelerator actuated device, and means acting on said second device rendered effective by the operation of said second device for holding the second device in operated condition once it has been operated by said accelerator actuated device to thereby maintain said clutches in their last mentioned conditions with respect to said pressure source and the transmission mechanism in its low ratio when the accelerator thereafter is moved from its said kick-down position to a closed throttle position.

33. In transmission mechanism for an automotive vehicle, the combination of driving and driven shafts, means for providing a power train between said shafts at a low speed ratio, means for providing a power train between said shafts at a high speed ratio, an accelerator, means under the control of said accelerator for breaking said high ratio power train and for completing said low ratio power train when the accelerator is moved to an open throttle kick-down position, said last named means including an electromagnet for causing this shift from high speed ratio to low speed ratio and a switch actuated by said accelerator at its said kick-down position and connected in series with said electro-magnet, and means for maintaining said transmission mechanism in low speed ratio when the accelerator is moved from its said kick-down position to a certain closed throttle position and including a switch actuated when said accelerator is moved to said certain closed throttle position and a resistor connected with said switch, said second-named switch and resistor being connected in series with each other and this switch-resistor circuit being connected in parallel with said first-named switch.

34. In transmission mechanism for an automotive vehicle, the combination of driving and driven shafts, means for providing a power train between said shafts at a low speed ratio, means for providing a power train between said shafts at a high speed ratio, an accelerator movable in a throttle operating range between a closed throttle position and an open throttle position and movable outside of said range at the closed throttle end of said range, means under the control of said accelerator for breaking said high ratio power train and for completing said low ratio power train when the accelerator is moved to an open throttle kick-down position, means for maintaining the transmission mechanism in said low ratio when the accelerator is moved back from its said kick-down position to its said closed throttle position, and means under the control of said accelerator for upshifting the transmission mechanism to its high speed ratio from said low ratio when the accelerator is thereafter moved out of its said range of movement at the closed throttle end of said range and then back into its said range.

35. In transmission mechanism for an automotive vehicle, the combination of driving and driven shafts, means for providing a power train between said shafts at a low ratio, means for providing a power train between said shafts at a high ratio, an accelerator for the vehicle, means under the control of the accelerator for establishing said low ratio power train upon movement in a full throttle opening direction and means under the control of said accelerator for upshifting the transmission mechanism from said low speed ratio to said high speed ratio by a movement of said accelerator in a throttle opening direction after the accelerator has previously been moved in the throttle closing direction to a predetermined position in its movement.

36. In transmission mechanism for an automotive vehicle, the combination of driving and driven shafts, means for providing a power train between said shafts at a low ratio, means for providing a power train between said shafts at a high ratio, each of said means including a power operated friction clutch for completing the respective power train, a source of power adapted to be connected with said clutches, an accelerator movable in a range of movement between open throttle and closed throttle positions and movable outside of said range on the closed throttle end of the range, and means for upshifting the transmission mechanism from said low speed ratio to said high speed ratio by disengaging said low speed ratio clutch and engaging said high speed ratio clutch by disconnecting and connecting said clutches respectively with said power source when the accelerator is moved from within its said range of movement outside of the range of movement at the closed throttle end of said range and back again into its said range of movement.

37. In transmission mechanism for an automotive vehicle, the combination as specified in claim 36, said means for upshifting the transmission mechanism including a switch actuated when the accelerator is moved out of its said range of throttle operating movement and another switch actuated when the accelerator is moved back into its throttle operating range.

38. In transmission mechanism for an automotive vehicle, the combination of driving and driven shafts, means for providing a forward drive power train between said shafts at a low ratio and including a friction coupling for completing the power train, means for providing a forward drive power train between said shafts at a high ratio and including a friction coupling for completing the power train, means for providing a reverse drive power train between said shafts and including said first-named friction coupling, an accelerator, means for conditioning the transmission mechanism for a drive either in forward or reverse, said friction couplings being under the control of said accelerator and said second-named friction coupling being engaged to start said vehicle in high speed forward drive when the accelerator is moved from a closed throttle position toward an open throttle position with the transmission mechanism being conditioned for forward drive and said first-named friction clutch being engaged and said second-named friction clutch being disengaged when the accelerator is thereafter moved to an open throttle kick-down position for downshifting the transmission mechanism from high speed ratio forward drive to low speed ratio forward drive, said first-named friction coupling being engaged when the accelerator is moved from a closed throttle position toward an open throttle position when the transmission mechanism is conditioned for reverse drive for starting the vehicle in reverse.

39. In transmission mechanism for an automotive vehicle, the combination of driving and driven shafts, a governor responsive to the speed of said driven shaft, means for providing a low speed ratio power train between said shafts, means for providing a high speed ratio power train between said shafts, means under the control of said governor for breaking said low speed ratio power train and completing said high speed ratio power train at a predetermined speed of said driven shaft, and means under the control of said governor for breaking said high speed ratio power train and completing said low speed ratio power train at a lower predetermined speed of said driven shaft, said two last-named means including an electro-magnetic device which when energized shifts the transmission mechanism from one speed ratio to the other, an electrical switch controlled by said governor and closed at said predetermined lower speed of said driven shaft, an electrical switch controlled by said governor and closed at said first-named predetermined speed of said driven shaft, and a resistor in parallel with said last-named switch, said switches and electro-magnetic device being connected in series with each other.

40. In a transmission mechanism for an automotive vehicle, the combination of driving and driven shafts, means providing a power train between said shafts adapted to start the vehicle from rest, said power train including a fluid pressure engaged friction clutch adapted to complete the power train, a source of fluid pressure, an accelerator, and means under the control of said accelerator for applying fluid pressure from said source to said friction clutch to engage the clutch to thereby complete the power train and start the vehicle when the accelerator is moved from a closed throttle position toward but substantially short of its open throttle position, said means under the control of said accelerator for engaging said friction clutch comprising an electro-magnet causing connection of the friction clutch with its source of fluid pressure when the electro-magnet is energized and a switch for energizing the electro-magnet, which switch is closed when the accelerator is moved from its said closed throttle position toward its open throttle position as specified.

41. In a transmission mechanism for an automotive vehicle having a brake associated therewith for stopping the vehicle, the combination of driving and driven shafts, means providing a power train between said shafts, an accelerator for the vehicle, means under the control of said accelerator for completing said power train to start the vehicle when the accelerator is moved from a closed throttle position toward an open throttle position, means for maintaining said power train completed when said accelerator is moved back from a throttle opening position to its original said closed throttle position, and means effective upon the operation of the brake for breaking said power train.

42. In a transmission mechanism for an automotive vehicle having a brake associated therewith for stopping the vehicle, the combination of driving and driven shafts, means providing a power train between said shafts, an accelerator for the vehicle, means under the control of said accelerator for completing said power train to start the vehicle when the accelerator is moved from a closed throttle position toward an open throttle position, means for maintaining said power train completed when said accelerator is moved back from a throttle opening position to its original said closed throttle position, and means actuated by the brake and effective during predetermined speeds of the vehicle for breaking said power train.

43. In a transmission mechanism for an automotive vehicle having a brake associated therewith for stopping the vehicle, the combination of driving and driven shafts, means providing a power train between said shafts, an accelerator for the vehicle, means under the control of said accelerator for completing said power train to start the vehicle when the accelerator is moved from a closed throttle position toward an open throttle position, means for maintaining said power train completed when said accelerator is moved back from a throttle opening position to its original said closed throttle position, means responsive to speeds of the vehicle below a predetermined speed thereof, and means actuated by the brake and effective during the response of said speed responsive means for breaking said power train.

44. In a transmission mechanism for an automotive vehicle, the combination of driving and driven shafts, means providing a power train between said shafts, an accelerator for the vehicle, means under the control of said accelerator for completing said power train to start the vehicle when the accelerator is moved from a closed throttle position toward an open throttle position, means for maintaining said power train completed when said accelerator is moved back from a throttle opening position to its original said closed throttle position, means for stopping the vehicle, and means effective during predetermined speeds of the vehicle and rendered operable by said stopping means for breaking said power train.

45. In a transmission for an automotive vehicle, the combination of driving and driven shafts, means comprising an electro-magnet for providing a power train between said shafts at low ratio, means comprising an electro-magnet for providing a power train between said shafts at a high ratio, an accelerator for the vehicle having a neutral closed throttle position and movable therefrom to open the vehicle throttle and having an open throttle kickdown position, means under the control of said accelerator for breaking said high ratio power train and for completing said low ratio power train when the accelerator is moved to its said kickdown position, said means under the control of said accelerator comprising a switch closed at said kickdown position and a relay in series with said switch connected to energize the electro-magnets, means for maintaining said first and second-named means in such condition when the accelerator is moved from its said kickdown position toward its said neutral position, said means for maintaining said first and second-named means in such condition comprising an accelerator controlled switch in parallel with said first-named switch and closed when the accelerator is moved from its said kickdown position toward said neutral position thereof and a resistor connected in series with said second-named switch and in series with said relay.

46. In a transmission mechanism for an automotive vehicle having a driving engine, said engine having an idling speed, the combination of driving and driven shafts, means providing a power train between said shafts and including a hydrodynamic coupling device in the power train and an engageable coupling for completing the power train through the hydrodynamic device, an accelerator for the vehicle engine, and means under the control of said accelerator for engaging said engageable coupling to thereby complete said power train through said hydrodynamic device when the accelerator is moved in throttle opening direction from a closed engine idling throttle position and comprising an electro-magnet arranged to engage said engageable coupling when the magnet is energized and a switch for energizing the electro-magnet, which switch is closed when the accelerator is moved from its said closed throttle position in the direction of throttle opening, whereby no drag torque is transmitted from said hydrodynamic device to said driven shaft under engine idling conditions.

47. In a transmission mechanism for an automotive vehicle having a driving engine, said engine having an idling speed, the combination of driving and driven shafts, means for providing a power train between said shafts and including a hydrodynamic power transmitting device in the power train and a fluid pressure engaged friction coupling for completing the power train when engaged, a source of fluid pressure adapted to be connected to said friction coupling, an accelerator for the vehicle engine, and means under the control of said accelerator for connecting said fluid pressure source with said friction coupling to engage the latter coupling and thereby complete said power train when the accelerator is moved from a closed engine idling throttle position in the direction of throttle opening and comprising an electro-magnet making said connection when the magnet is energized and a switch for energizing the electro-magnet, which switch is closed when the accelerator is moved in the direction of throttle opening from its said closed throttle position, whereby no drag torque is transmitted from said hydrodynamic device to said driven shaft under engine idling conditions.

GEORGE E. FLINN.

(References on following page)

REFERENCES CITED

The following references are of record in the file of this patent:

UNITED STATES PATENTS

| Number | Name | Date |
|---|---|---|
| 907,711 | Anthony | Dec. 29, 1908 |
| 1,147,417 | Marburg | July 20, 1915 |
| 1,609,782 | Small | Dec. 7, 1926 |
| 1,943,534 | Koulichker et al. | Jan. 16, 1934 |
| 1,946,200 | Easter | Feb. 6, 1934 |
| 1,952,767 | McCollum et al. | Mar. 27, 1934 |
| 1,986,037 | Winther | Jan. 1, 1935 |
| 2,051,553 | Fleischel | Aug. 18, 1936 |
| 2,103,540 | Livermore | Dec. 28, 1937 |
| 2,120,104 | Livermore | June 7, 1938 |
| 2,129,358 | McCollum et al. | Sept. 6, 1938 |
| 2,141,096 | Thurber | Dec. 20, 1938 |
| 2,195,365 | Getaz | Mar. 26, 1940 |
| 2,210,237 | Fuhrer | Aug. 6, 1940 |
| 2,252,009 | Kenny | Aug. 12, 1941 |
| 2,254,335 | Vincent | Sept. 2, 1941 |
| 2,257,674 | Dunn | Sept. 30, 1941 |
| 2,263,400 | Schwarz | Nov. 18, 1941 |
| 2,288,594 | Neracher et al. | July 7, 1942 |
| 2,304,862 | Thoma | Dec. 15, 1942 |
| 2,317,423 | Vincent | Apr. 27, 1943 |
| 2,348,435 | Hey et al. | May 9, 1944 |
| 2,375,440 | Roche | May 8, 1945 |
| 2,376,545 | Livermore | May 22, 1945 |